Oct. 11, 1955     A. W. RICHENS     2,720,247

HEAT SEALING JAWS

Filed May 14, 1953

Arthur W. Richens,
INVENTOR,

BY Rosa C. Hurrey
ATTORNEY

United States Patent Office 2,720,247
Patented Oct. 11, 1955

2,720,247
HEAT SEALING JAWS

Arthur W. Richens, Chester County, Pa., assignor to Continental Can Company, Inc., New York, N. Y., a corporation of New York Application May 14, 1953, Serial No. 354,908

2 Claims. (Cl. 154—42)

It is an object of the present invention to provide a method and means for effectuating a truly hermetic heat seal across either end of a gusseted tube.

It is a further object of this invention to provide a method and means as aforesaid in which a controlled pressure is concentrated at certain critical areas in the top or bottom of a gusseted tube.

The above and other objects will be made clear from the following detailed description taken in connection with the annexed drawings, in which.

The problem of heat sealing the interior of a gusseted bag long has confronted and confounded the industry. When gussets are formed in a tube, obviously there exists within the area of the gussets at least four thicknesses of material and between the inner extremities of the gusset folds there will be only two thicknesses of material. Each ply, of course, doubles the number of thicknesses and therefore increases the differential between the area of the gussets and the area between the apices of the gussets.

To meet the problem of differential thickness, resort has been had to uniform resilient backing bars formed of rubber or silicone on the theory that these would conform so closely to the differential of thickness as to perfect a seal but in practice such resilient bars merely reduce the percentage of "leakers" but not to a significant extent.

Resort has also been had to serrated, mating backing bars on the theory that a multiplicity of sealable seal lines would do the job. In all cases, however, this treatment seriously weakens the material and by no means overcomes the problem of "leakers."

A third general effort has been to apply intense concentrated pressure over a line of very narrow width. This, however, requires extraordinarily close registration of the sealing bars and raises considerable danger of cutting through the material without, however, attaining complete elimination of leakers.

The present invention contemplates the application of perfectly normal sealing pressures over perfectly normal sealing areas with a concentration of pressure in very limited areas adjacent the critical points.

Figure 1:
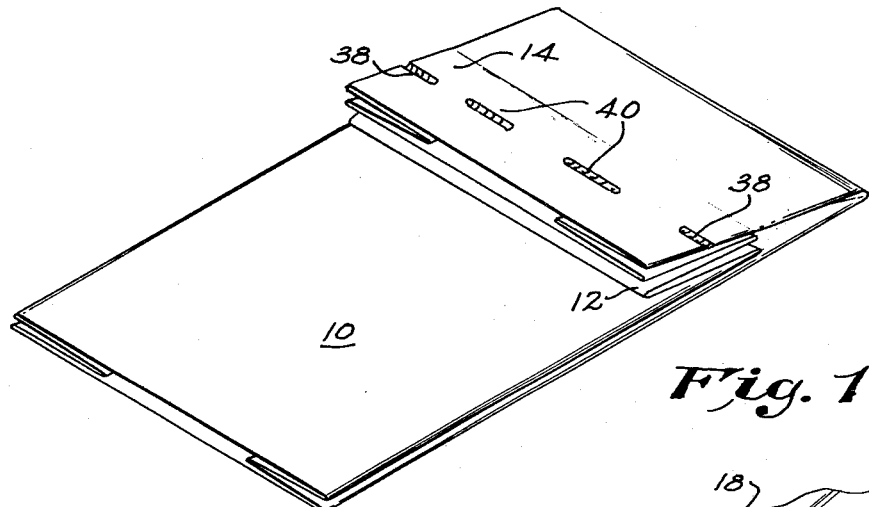
Figure 1 is a perspective view of a gusseted tube having a bottom of the "automatic" type.

Referring now to Figure 1 there is shown a gusseted tube 10, one end of which has been folded in accordance with my application Serial No. 52,465 filed October 2, 1948, entitled "Bags and Methods of Making Them," now Patent No. 2,648,263, to form an automatic bottom 12, and an upstanding fin 14. The fin 14 is to be sealed transversely and then by adhesive or any other suitable means secured to the bottom 12. The interior surface of the tube 10 is thermoplastic at least within the area of the fin 14. In short, the entire tube 10 may be formed of thermoplastic material, for example, pliofilm, vinylite, or any of the other available polymers, or the tube may be formed of paper with its interior coated with a suitable thermoplastic, or the tube might be multi-ply with the inner ply formed of thermoplastic material, or the tube may be formed of a non-thermoplastic such as paper with spaced transverse bands of thermoplastic material printed on the interior surface in the manner suggested by Haskell Patent No. 2,062,265. All that really matters so far as the present invention is concerned is that the inner surface of the tube within the area to which heat and pressure are to be applied shall be sufficiently thermoplastic to effect a seal.

Figure 2:
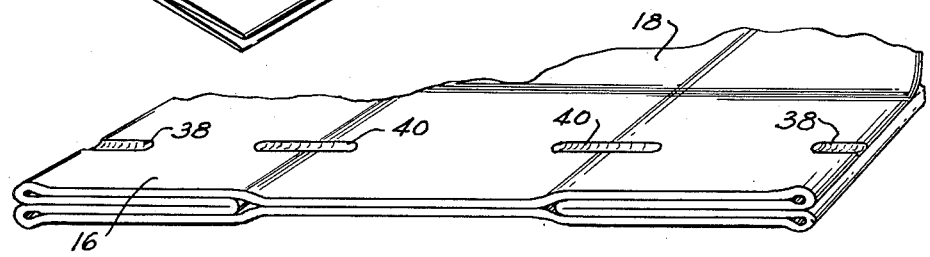
Figure 2 is a perspective view showing the mouth or bottom end of a "square" bag sealed in accordance with my invention.

Referring now to Figure 2, there is shown an end 16 of a gusseted tube 18. This might be in the form of the fin 14 of Figure 1 or the bottom end of an ordinary square bag or the mouth of a square bag. It is only necessary to assume that the interior of the bag within the critical area be, as noted above, sufficiently thermoplastic to effect a seal. In making such a seal the fin or bag end is placed between a backing bar 20 and a pressure bar 22. Mounted in the pressure bar 22 are studs 24, each surrounded by a spring 26. The springs 26 bear at one end against the head 28 and the studs 24 and at the other end against transverse bearing members 30 which are slidably mounted on the studs 24. Each end of the members 30 bears on the head 32 of a pin 34. Each pin 34 has a chisel-shaped point 36. These points are in alignment transverse to the bag and are kept in alignment by engagement of the pressure member 30 with the cut-away heads 32. As the heated bars 20 and 22 approach each other the chisel-shaped ends 36 first contact the outer extremities of the gussets 38 and the inner extremities of the gussets 40 as shown in Figures 1 and 2. Continued movement of the bars 20 and 22 indents the bag in areas 38 and 40 and compresses the springs 24. Ultimately the points 36 are retracted to the plane of the bar 22 which then with the bar 20 completes the normal seal. At areas 38 and 40, however, there is an extra indentation and compression which effectively seals off the potential channels of leakage.

Figures 3, 4:
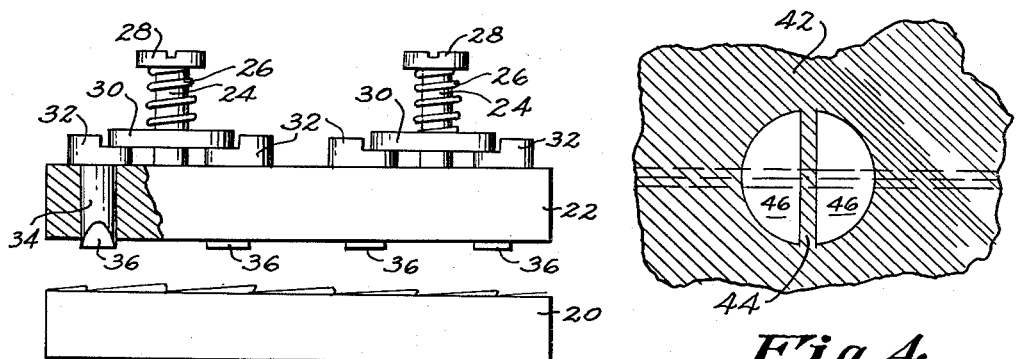
Figure 3 is a side elevation partly in section of an apparatus for forming a seal acording to my invention.
Figure 4 is a plan view showing the detail of an individual controlled pressure, concentrated seal.

In Figure 4 the shaded area 42 indicates the normal sealing area as it would be effected by bars 20 and 22 in the absence of the pins 34. The area sealed by one of the points 36 is indicated at 44 and has on each side of it an unsealed area 46. The unsealed area 46 together with the sealed area 44 amount to the cross-section of each pin 34.

It is to be understood that the present invention is applicable in any kind of bag-making or bag-closing machine and is not to be considered as limited to the precise embodiment herein discussed.

I claim:

1. A method of sealing bags or tubes comprising: subjecting a tube having intucked gusset folds at opposite sides to heat and pressure over a substantial area transverse the width of the bag and intensifying the pressure over predetermined limited, mutually spaced areas within the first mentioned area, said areas of intensified pressure overlying at least the apices of the gusset folds.

2. Means for heat sealing bags comprising: a pair of pressure members movable toward and from each other; means for heating at least one of said pressure members; supplementary pressure pins protruding through one of said members and means resiliently to resist movement of said pressure pins into the plane of said pressure member, said pins having alined chisel shaped ends.

References Cited in the file of this patent

UNITED STATES PATENTS

| 2,390,550 | Moore | Dec. 11, 1945 |
| 2,633,894 | Carwile | Apr. 7, 1953 |
| 2,638,964 | Andina | May 19, 1953 |